United States Patent
Ionov et al.

(10) Patent No.: US 6,804,471 B1
(45) Date of Patent: Oct. 12, 2004

(54) APPARATUS AND METHOD OF PULSED FREQUENCY MODULATION FOR ANALOG OPTICAL COMMUNICATION

(75) Inventors: Stanislav I. Ionov, Calabasas, CA (US); Robert R. Hayes, Calabasas, CA (US)

(73) Assignee: HRL Laboratories LLC, Malibu, CA (US)

( * ) Notice: Subject to any disclaimer, the term of this patent is extended or adjusted under 35 U.S.C. 154(b) by 0 days.

(21) Appl. No.: 09/475,571

(22) Filed: Jan. 5, 2000

(51) Int. Cl.[7] ............................. H04B 10/04; H04B 10/06
(52) U.S. Cl. ..................... 398/187; 398/183; 398/188; 398/189; 398/200; 398/214
(58) Field of Search ..................... 359/154, 174, 359/182, 184, 188, 195, 124, 181; 398/188, 189, 183, 187

(56) References Cited

U.S. PATENT DOCUMENTS

| | | | | |
|---|---|---|---|---|
| 3,956,626 A | * | 5/1976 | Ross ........................... 250/199 |
| 4,857,844 A | | 8/1989 | Van Vaals ................... 324/307 |
| 4,932,739 A | * | 6/1990 | Islam ........................ 350/96.15 |
| 5,101,456 A | * | 3/1992 | Islam ........................... 385/27 |
| 5,131,060 A | * | 7/1992 | Sakata ........................... 385/2 |
| 5,189,714 A | * | 2/1993 | Okayama et al. ............ 385/27 |
| 5,245,461 A | | 9/1993 | Fitzmartin ................... 359/195 |
| 5,400,265 A | | 3/1995 | Kauppinen .................. 356/346 |
| 5,579,105 A | | 11/1996 | Belton et al. ............... 356/310 |
| 5,594,577 A | * | 1/1997 | Majima et al. .............. 359/124 |
| 5,606,541 A | * | 2/1997 | Finkelstein et al. ......... 369/112 |
| 5,646,762 A | * | 7/1997 | Delavaux et al. ........... 359/173 |
| 5,726,855 A | * | 3/1998 | Mourou et al. ............. 361/213 |
| 5,739,945 A | * | 4/1998 | Tayebati ..................... 359/291 |
| 5,742,418 A | * | 4/1998 | Mizutani et al. ............ 359/156 |
| 5,742,714 A | | 4/1998 | Byron ........................ 385/27 |
| 5,786,913 A | | 7/1998 | Pfeiffer ...................... 359/119 |
| 5,847,863 A | * | 12/1998 | Galvanauskas et al. ..... 359/341 |
| 5,923,683 A | * | 7/1999 | Morioka et al. ............... 372/6 |
| 5,963,567 A | * | 10/1999 | Veselka et al. ............... 372/21 |
| 5,974,209 A | | 10/1999 | Cho et al. .................... 385/28 |
| 6,014,479 A | * | 1/2000 | Darcie ......................... 385/24 |
| 6,122,305 A | * | 9/2000 | Putnam et al. ................ 372/94 |
| 6,204,920 B1 | * | 3/2001 | Ellerbrock et al. ......... 356/345 |
| 6,295,130 B1 | * | 9/2001 | Sun et al. ................... 356/454 |
| 6,396,605 B1 | * | 5/2002 | Heflinger et al. ........... 359/154 |

FOREIGN PATENT DOCUMENTS

| | | |
|---|---|---|
| EP | 0 473 873 | 3/1992 |
| EP | 0 591 866 | 4/1994 |
| WO | 99/25081 | 5/1999 |
| WO | 00/51271 | 8/2000 |

OTHER PUBLICATIONS

Kalman, R.F. et al., "Dynamic Range of Coherent Analog Fiber–Optic Links," *Journal of Lightwave Technology*, vol. 12, No. 7, (Jul. 1994), pp. 1263–1277.

(List continued on next page.)

Primary Examiner—M. R. Sedighian
(74) Attorney, Agent, or Firm—Ladas & Parry LLP

(57) ABSTRACT

A method and apparatus for pulse frequency modulation for analog optical communication. A train of optical pulses is generated. The spectrum of the optical pulses in the train of optical pulses can be broadened to provide a train of broad spectrum optical pulses. The broadening can be provided by self-phase modulation. Alternatively, broad spectrum optical pulses can be provided by merely having the optical pulses be less than 1 ps duration. A desired optical frequency slice from the train of spectrum broadened optical pulses is selected by a tunable Fabry-Perot filter. A desired optical frequency slice from the broad spectrum optical pulses is selected by a tunable Fabry-Perot filter. The tunable Fabry-Perot filter has a pair of Distributed Bragg Reflectors separated by an electro-refractive section. The electro-refractive section has tuning electrodes for applying transverse electric fields to the electro-refractive section, corresponding to an analog waveform being applied to the tuning electrodes, to provide a pulse-frequency modulated train of optical pulses.

20 Claims, 6 Drawing Sheets

OTHER PUBLICATIONS

Hirano, A. et al., "All-optical limiter circuit based on four-wave mixing in optical fibres," *Electronics Letters*, vol. 34, No. 14 (Jul. 9, 1998), pp. 1410–1411.

Sorin, W.V. et al., "Frequency Domain Analysis of an Optical FM Discriminator," *Journal of Lightwave Technology*, vol. 10, No. 6, (Jun. 1992), pp. 787–793.

Swanson, E.A. et al., "High Sensitivity Optically Preamplified Direct Detection DPSK Receiver with Acitve Delay–Line Stabilization," *IEEE Photonic Technology Letters*, vol. 6, No. 2 (Feb. 1994), pp. 263–265.

Wong, William S., et al., "Self–switching of optical pulses in dispersion–imbalanced nonlinear loop mirrors", *Optic Letters*, vol. 22, No. 15, pp. 1150–1152 (Aug. 1, 1997).

Mamyshev, P.V., "All–Optical Data Regeneration based on self–phase modulation effect", *ECOC'98*, 20–24, pp. 475–6 (Sep. 1998).

"Fabry–Perot Interferometer" data from SCIMEDIA Http://www.scimedia.com/chem–ed/optics/selector/fabry–pe.htm (Dec. 7, 1999).

"Electromagnetic Spectrum" data from SCIMEDIA Http://www.scimedia.com/chem–ed/light/em–spec.htm (Dec. 7, 1999).

Delorme, F., et al., "Ultra–Fast Optical Switching Operation of DBR Lasers Using an Electro–Optical Tuning Section," *IEEE Photonics Tech. Letters*, vol. 7, No. 3 (Mar. 1995), pp. 269–271.

Mamyshev, P. V., "All Optical Data Regeneration Based on Self–Phase Modulation Effect, " ECOC'98 (Madrid, Sep. 1998), pp. 475–476.

Wong, W.S., et al., "Self–switching of Optical Pulses in Dispersion–imbalanced Nonlinear Loop Mirrors," *Optics Letters*, vol. 22, No. 15 (Aug. 1997), pp. 1150–1152.

\* cited by examiner

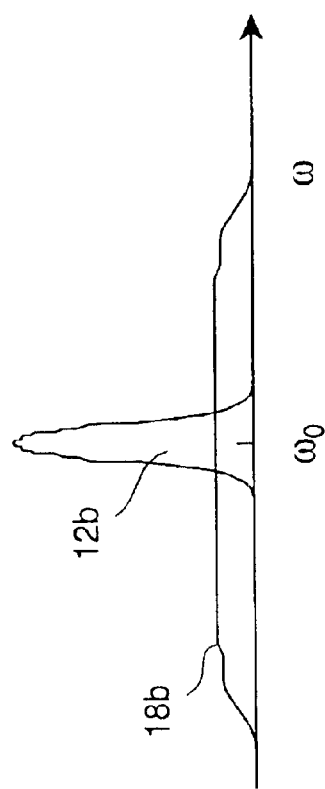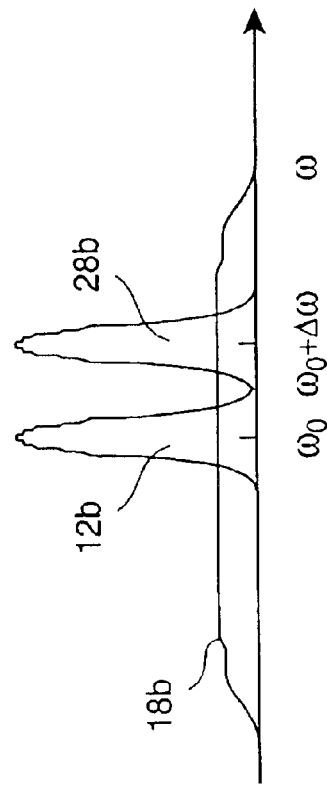

APPARATUS AND METHOD OF PULSED FREQUENCY MODULATION FOR ANALOG OPTICAL COMMUNICATION

FIELD OF THE INVENTION

This invention relates to the field of communications, and, in particular, to optical frequency modulation devices useable in satellite communications systems.

BACKGROUND

Orbiting satellites are an important aspect of modern communication systems. Originally used for "single-bounce" communication, with a signal going up from one place on the surface of the earth and coming down in another, communication satellites are now being used to form complex networks in space, with each satellite in the network being able to communicate with many of the other satellites. Optical intersatellite links, with their high directionality, high energy efficiency, and tremendous information bandwidth, allow satellites to talk to one another, and to transmit a much larger amount of information.

Many satellite and terrestrial optical communication systems require transmission of analog optical signals. One known way to meet this transmission need is by employing amplitude modulation (AM) of an optical carrier. This approach, however, suffers from poor signal-to-noise ratio (SNR).

It is also well known that broadband modulation schemes, which utilize higher bandwidth than that of the transmitted information, may improve the SNR over that achieved with AM. One such technique is frequency modulation (FM). It is well known that the SNR of an FM system may be improved dramatically by using a higher frequency swing $F_{FM}$ than the bandwidth of the transmitted information $\Delta f$, as described by in H. S. Black's "Modulation Theory", published by D. Van Nostrand (1953), wherein:

$$SNR_{FM} \propto SNR_{AM}(f_{FM}/\Delta f)^2, \quad (1)$$

where $SNR_{AM}$ is the signal-to-noise ratio of an AM communication system with identical optical power.

It is also known that FM optical signals can be obtained by modulating the current of a semiconductor laser. This technique, however, suffers from simultaneous amplitude modulation, and it provides a very limited frequency swing $f_{AM}$<20 GigaHertz (GHz).

In order to realize SNR advantages of optical FM, the FM receiver must include a limiter that eliminates amplitude noise of the received optical signal without affecting its frequency contents. Such all-optical limiters can be easily made for pulsed signals, e.g., based upon non-linear optical loop mirrors (NOLM), such as described in Wong et al. in Optics Letters, Vol. 22, 1997, p. 1150, or on SPM as described in the Mamyshev article, "All-optical Data Regeneration Based on Self-Phase Modulation Effect", ECOC98, p. 475. These techniques, however, are hard to implement for continuous optical signals.

Therefore, to better help realize practical optical intersatellite links, there exists a need for an effective FM system and method for analog optical communication. The present invention provides a solution to meet such need.

SUMMARY OF THE INVENTION

In accordance with the present invention an apparatus and method of optical frequency modulation is provided based upon spectral broadening of optical pulses via self phase modulation (SPM) followed by frequency selection by a fast tunable Fabry-Perot filter formed by two Distributed Bragg Reflectors (DBRs).

For realizing the SNR advantages of FM, an optical communication system needs an optical limiter in its receiver that equalizes the amplitude of a signal without changing its frequency. In a high bandwidth communication system, it is highly desirable to do limiting in the optical domain because of electronic speed limitations. While optical pulse reshaping and limiting based on SPM effect in optical fibers followed by spectral filtering has been described in the Mamyshev article, in accordance with the present invention this technique is combined with a tunable DBR filter to achieve FM pulses for optical communication.

The proposed system benefits from its pulsed format that allows the use of NOLM, such as described in the aforementioned Wong et al. article, or other optical regeneration techniques, such as delineated in the Mamyshev article, for optical limiting, which is not possible in a continuous wave FM system.

The advantages of the inventive approach described hereinbelow include: (1) a large FM swing of several hundred GHz, which is important for improving SNR, and (2) compatibility with optical limiting.

Therefore, in accordance with a preferred embodiment of the present invention a method and apparatus for pulse frequency modulation for analog optical communication is provided. A train of optical pulses is generated. The spectrum of the optical pulses in the train of optical pulses can be broadened to provide a train of broad spectrum optical pulses. The broadening can be provided by self-phase modulation. Alternatively, broad spectrum optical pulses can be provided by merely having the optical pulse duration be shorter than 1 ps. A desired optical frequency slice from the broad spectrum optical pulses is selected by a tunable Fabry-Perot filter. The tunable Fabry-Perot filter has a pair of Distributed Bragg Reflectors separated by an electro-refractive section. The electro-refractive section has tuning electrodes for applying transverse electric fields to the electro-refractive section, corresponding to an analog waveform being applied to the tuning electrodes, to provide a pulse-frequency modulated train of optical pulses.

Recovery of the analog waveform from the pulse-frequency modulated train of optical pulses is also provided. The pulse-frequency modulated train of optical pulses is spilt into a first optical beam and a second optical beam. A first photodetector is provided, the first photodetector providing a first current responsive to the first optical beam input thereon. The first photodetector has a first photodetector spectral response and is biased such that the first current is in a first direction. A second photodetector is also provided, the second photodetector providing a second current responsive to the second optical beam input thereon. The second photodetector has a second photodetector spectral response and is biased such that the second current is in the first direction. An input of a transimpedance amplifier is coupled to an output of the first photodetector and to an input of the second photodetector to provide an output of the transimpedance amplifier proportional to the difference between the first current and the second current. A first optical filter is provided to receive the first optical beam prior to incidence upon the first photodetector and a second optical filter is provided to receive the second optical beam prior to incidence upon the second photodetector. The first photodetector spectral response and the second photodetector spectral response are each broader than respective passbands of the first optical filter and the second optical filter to provide photocurrent vs. optical frequency characteristics determined by the respective first optical filter and the second optical filter.

BRIEF DESCRIPTION OF THE DRAWINGS

FIG. 2 shows the spectra of a representative incident pulse and a representative pulse after self-phase modulation in accordance with the present invention.

FIG. 3 shows the spectra of a representative output pulse after filtering in accordance with the present invention.

DETAILED DESCRIPTION

Figure 1:
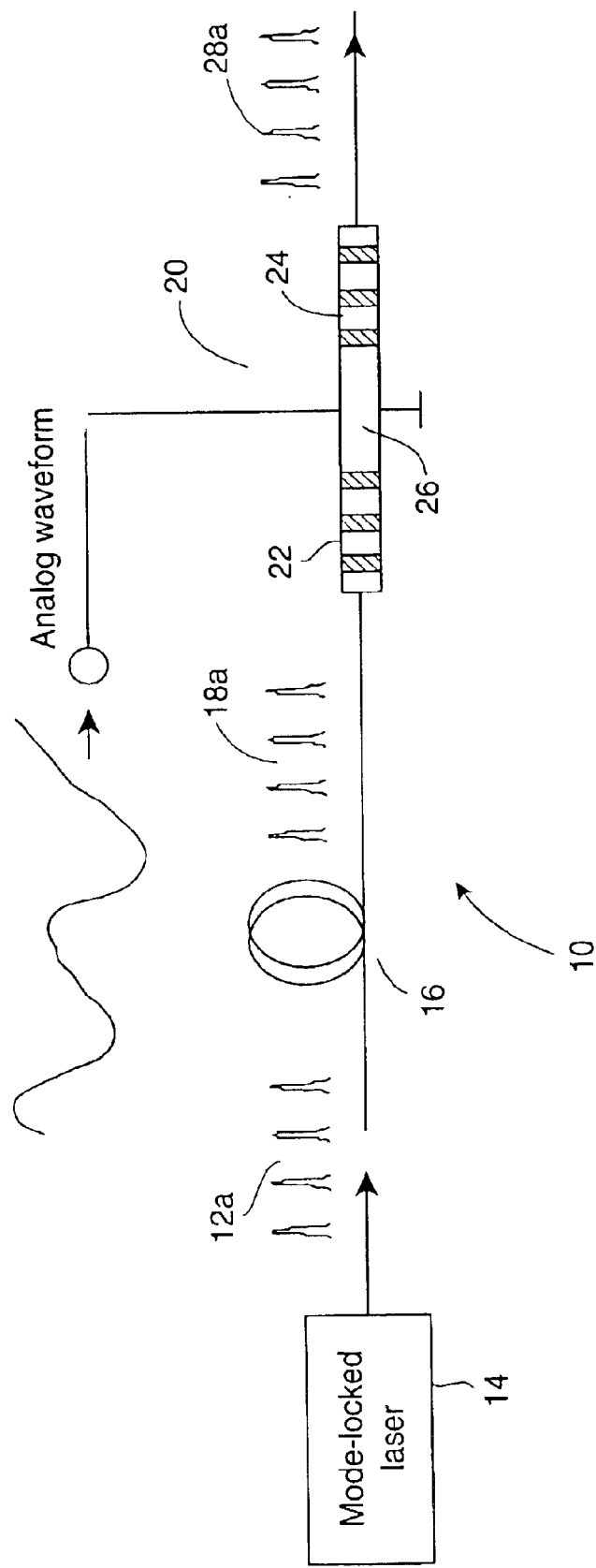
FIG. 1 shows in schematic form an embodiment of a pulsed frequency modulator in accordance with the present invention.

Referring to FIG. 1, pulsed FM transmitter 10 in accordance with the present invention is shown. Train of equally spaced picosecond optical pulses 12a is generated by a mode-locked laser 14. This is a mature technology capable of producing 40 GHz trains of pulses at =1.55 μm with sub-picosecond pulse duration. Similar to the optical regeneration scheme proposed by Mamyshev in the hereinabove referenced article, the train of pulses enters a length of fiber 16 that has a small normal dispersion (e.g., true wave fiber from Lucent). In fiber 16, the pulses undergo self-phase modulation (SPM) that broadens their spectrum, resulting in output pulses 18a. The spectra of a representative incident pulse 12b and representative output pulse 18b are shown schematically in the FIG. 2. It is important to emphasize that the spectrum of output pulses is almost rectangular-shaped after a normal dispersion fiber if its dispersion length, $L_D = \tau^2/\beta_2$, is larger than the non-linear length, $L_{NL} = cA_{eff}/n_2\omega_0 I_p$, where c is the speed of light, τ, $\omega_0$ and $I_p$ are pulse duration, optical frequency and intensity, $\beta_2$, $A_{eff}$ and $n_2 = 2.6 \times 10^{-16}$ cm$^2$/W are the fiber dispersion, effective core area and non-linear refractive index, respectively.

The bandwidth of SPM-broadened pulses is estimated as $$\Delta\omega_{SPM} \approx \Delta\omega_0 (2\pi/\lambda) n_2 I_p L, \quad (2)$$

where $\Delta\omega_0 \sim 1/\tau$ is the bandwidth of the input pulses and L is the fiber length. For example, a train of pulses with 20% duty cycle (e.g., 5 ps duration and 40 GHz PRF) and an average power of ~40 mW experiences broadening of $\Delta\omega_{SPM}/\Delta\omega_0 \approx 2.4$ in 15 km of fiber. Shorter pulses, i.e., those having pulse duration shorter than 1 ps, of coming at 40 GHz require only one fifth of that length for the same amount of broadening.

The desired optical frequency slice is selected from SPM-broadened pulses by tunable Fabry-Perot filter 20 comprised of two DBR structures 22, 24 separated by electro-refractive (ER) section 26 supplied with electrodes. ER section 26 may be a passive Franz-Keldysh semiconductor waveguide, such as that described in the article by Delorme, et al. in IEEE Photonics Technical Letters, Vol. 7, (1995), p. 269. Alternatively, it can be made of LiNbo$_3$. The filter has a narrow transmission bandwidth centered at $$\lambda = 2nh/m, \quad (3)$$

where h is the spacing between the DBR reflectors, n is the semiconductor index of refraction and m is an integer. The spacing is chosen to provide sufficient free spectral range $\Delta\lambda_{free}$, h<$\lambda^2$/(2n $\Delta\lambda_{free}$). For $\Delta\lambda_{free}$=5 nm and n=3, this gives h<75 μm. The spectral resolution of the filter, δλ, is determined by the reflectivity of the DBR structures, R, $$\frac{\delta\lambda}{\lambda} = \frac{1-R2}{4R} \frac{\lambda}{4\pi nh} \quad (4)$$

which gives δλ≈0.05 nm for R=0.9 and h=75 μm. Broader spectral bandwidth is easily achieved by reducing the reflectivity of DBR, R, or the spacing h. The smallest spacing h≈0.26 μm is determined by (3) with m=1, which gives δλ=15 nm for the same R.

The filter is tuned by applying transverse electric field to the ER section. A forward or reverse voltage may be applied to the semiconductor ER section, thus changing the refractive index by changing the carrier density or via Stark effect, respectively. The achieved wavelength shift is proportional to the change in refraction index, $\Delta\lambda_{shift}/\lambda = \Delta n/n$. More than 2 nm wavelength shifts in both directions (4 nm total) have been demonstrated by applying this technique to active DBR lasers, as set forth in Delorme, et al. referenced above. The wavelength change of $\lambda_{shift}$=2 nm corresponds to the optical frequency shift of $\Delta v_{shift} = -\Delta\lambda_{shift} c/\lambda^2$=250 GHz. Such frequency swings will offer large SNR improvements in an FM communication system transmitting tens of GHz of information bandwidth, as evident from Equation (1). Resultant filtered pulse train 28a has a representative pulse spectra 28b shown schematically in the FIG. 3.

Figure 4:
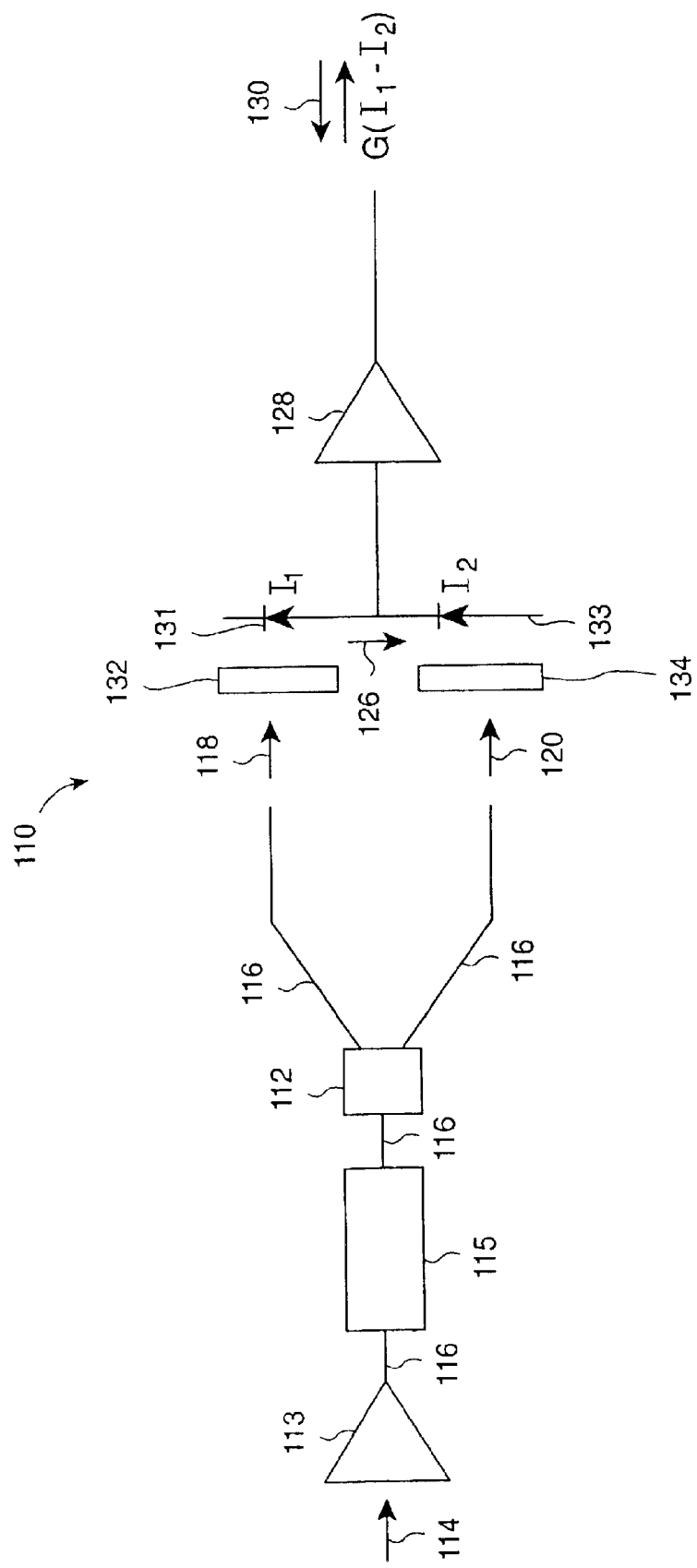
FIG. 4 shows in schematic form an optical discriminator in accordance with the present invention.
Figure 5A:
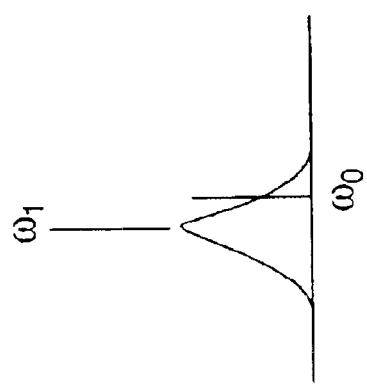
FIGS. 5a and 5b show passbands of filters of the optical discriminator of FIG. 4.
Figure 5B:
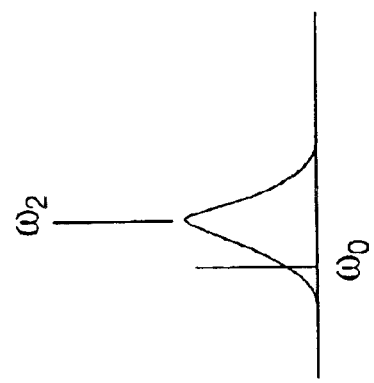

In order to recover the modulation information, the frequency shift associated with each pulse must be converted into an electrical signal that is proportional to this shift. One way of doing this is shown in FIG. 4. wherein optical discriminator 110 includes optical splitter 112, which can be either a conventional 50:50 fiber optical splitter, (such as, for example, a Gould 22-1-0355-50-1120), or, for an unguided free-space beam, a bulk-optic 50:50 beam splitting cube (such as, for example, a Newport 05BC16NP.11), which receives the frequency-modulated optical beam 114, either guided by conventional single-mode 116, or propagated as an expanded free-space beam. Optical beam 114 is amplified by amplifier 113 and clipped by limiter 115. Optical splitter 112 divides optical beam 114 into two equal-intensity beams 118, 120. Optical filters 132, 134 are inserted in front of respective semiconductor photodetectors 131, 133. Semiconductor photodetectors 131, 133 in this embodiment have a spectral response that is much broader than the passbands of filters 132 1,34, depicted in FIGS. 5a and 5b respectively, so that the photocurrent vs. optical frequency characteristic of the filter-detector combination is determined by the filters alone.

Each of beams 118, 120 which pass through optical filters 132, 133 impinges upon respective photodetectors, 131, 133. Photodetectors 131, 133 are biased (not shown) in such a way that the current flow is in direction 126. If the frequency of light beams 118, 120 coincides with the passband of filter 132, then the current $I_1$ through photodetector 131 will be large, and the current $I_2$ through photodetector 133 will be almost zero. Because almost no current can flow through the photodetector 133 (i.e., it has been "optically" turned off), the entire current must flow into transimpedance amplifier 128, (such as, for example, an Avantek ITA-02070 for applications below 1 GHz), coupled to the junction of photodetector 31 and photodetector 133. Signal 130, which is generally described as G ($I_1$–$I_2$) where G is the gain of transimpedance amplifier 128, out of transimpedance amplifier 128 will thus be proportional to $I_1$, and will be positive. If the frequency of light beams 118, 120 is shifted so that it now coincides with the passband of filter 134, the reverse will occur, namely current flow is now out of transimpedance amplifier 128, not into it, so that output signal 130 will be proportional to current $I_2$ through photodetector 33, and will be negative. The optical discriminator embodiment of FIG. 4 thus amplifies only the difference in detector currents. Electrically speaking, it has high common-mode rejection.

Optical filters 132, 134 are fabricated to have a Lorentzian line shape. In fact, commercially available Fabry-Perot filters, (such as, for example, the fiber-optic Micron Optics FFP-TF series), in addition to having the desired line shape, can also be mechanically tuned for whatever wavelength one desires. One can thus adjust the wavelength separation between the two filters so that $\zeta=\Omega$, insuring that one achieves the highest (maximum) linearity. An added advantage is that one can then readjust the filters to operate at other wavelengths. One device, therefore, can be manufactured that will satisfy a broad range of operating wavelengths, so that one could, for example, tune the discriminator to operate anywhere within the entire bandwidth of an Erbium doped fiber amplifier (1530–1560 nm wavelength). For very high-speed operation, the photodetectors of choice would, today, be InGaAs pin semiconductor devices. In particular, the use of fiber-optic filters together with dual-balanced, fiber-coupled detectors, such as the newly-developed NTT Electronics Corp NEL model KEPD2552KYG, would allow one to achieve greater than 20 GHz response using commercial off-the-shelf devices.

Figure 6:
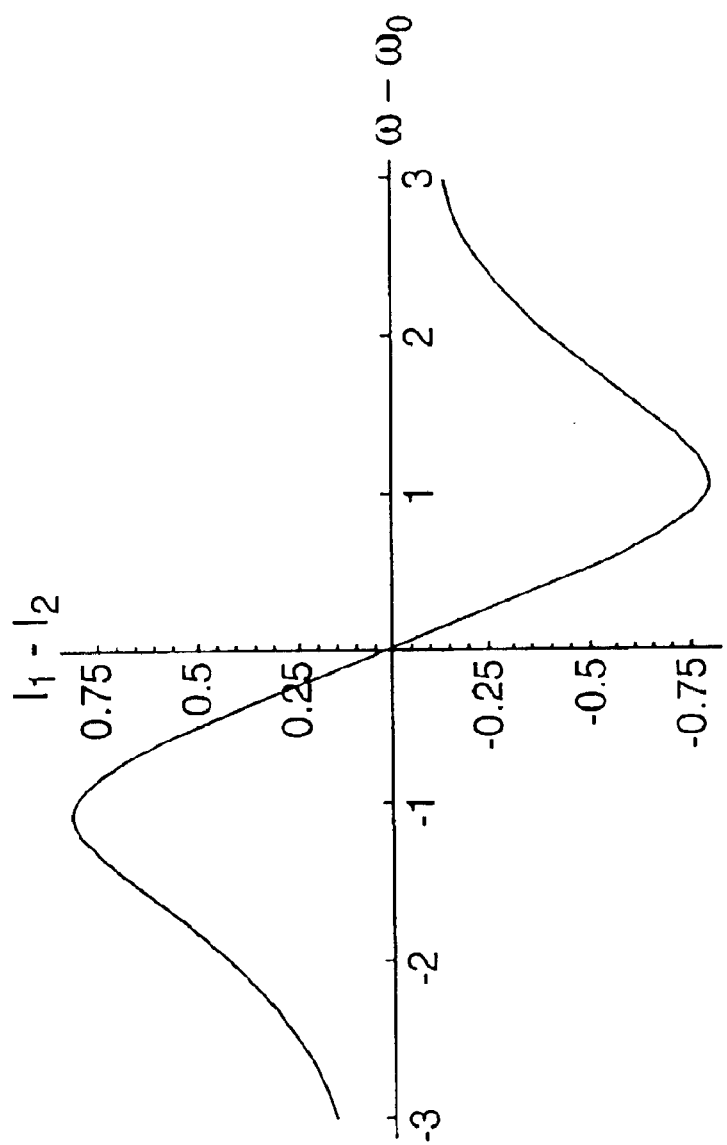
FIG. 6 shows in graph form a difference current of the optical discriminator of FIG. 4 as a function of frequency deviation of incident light.

In essence, received light pulses are amplified, clipped, and then split into two branches. The pulses pass through filters that are shifted relative to a center frequency. The transmitted light is then converted into two electrical currents, the difference of which is fed into an electrical amplifier. In FIG. 6, there is shown a difference current as a function of the frequency deviation of the incident light.

As each pulse is processed by discriminator 110, it generates a current pulse having an amplitude that is proportional wavelength offset of the pulse. One thus has a stream of pulses with each pulse having a height proportional to the analog signal used to generate the frequency shift of that pulse. By passing this pulse stream through a low-pass electrical filter, that pulse. By passing this pulse stream through a low-pass electrical filter, this pulse stream is converted into a continuous analog signal.

The criteria that must be satisfied in order to realize the processing gain associated with the desired FM system appear to have been met for the particular implementation desribed hereinabove:
(1) the system uses a bandwidth that is much larger than the modulation bandwidth of the analog signal;
(2) it is affected only by the noise in the bandwidth of the analog signal; and
(3) all amplitude noise associated with the utilized bandwidth has been removed by the limiter (pulse clipper).

There is, however, a point that should be made about the clipping process. A limiter is usually used to limit the absolute amplitude of the incoming signal. However, in accordance with the present invention, it serves two functions. As in other FM systems, it limits the pulse amplitude to some fixed value. However, unlike other applications, it also sets a lower threshold, below which no pulse will be passed. If it does not do this, then the optical amplifier noise that exists between pulses will generate noise by noise fluctuations at the photodetectors. These fluctuations have a large low-frequency component that will limit the amount of FM advantage that be passed (which one can easily do because of the very large CNR in the pulse), quiescent noise between pulses can be eleiminated. This double function has been demonstrated by a variety of nonlinear optical loop mirror limiter, as described in the hereinbefore mentioned Wong et al. article and in the SPM pulse regeneration scheme described in the Mamyshev article.

Figure 7:
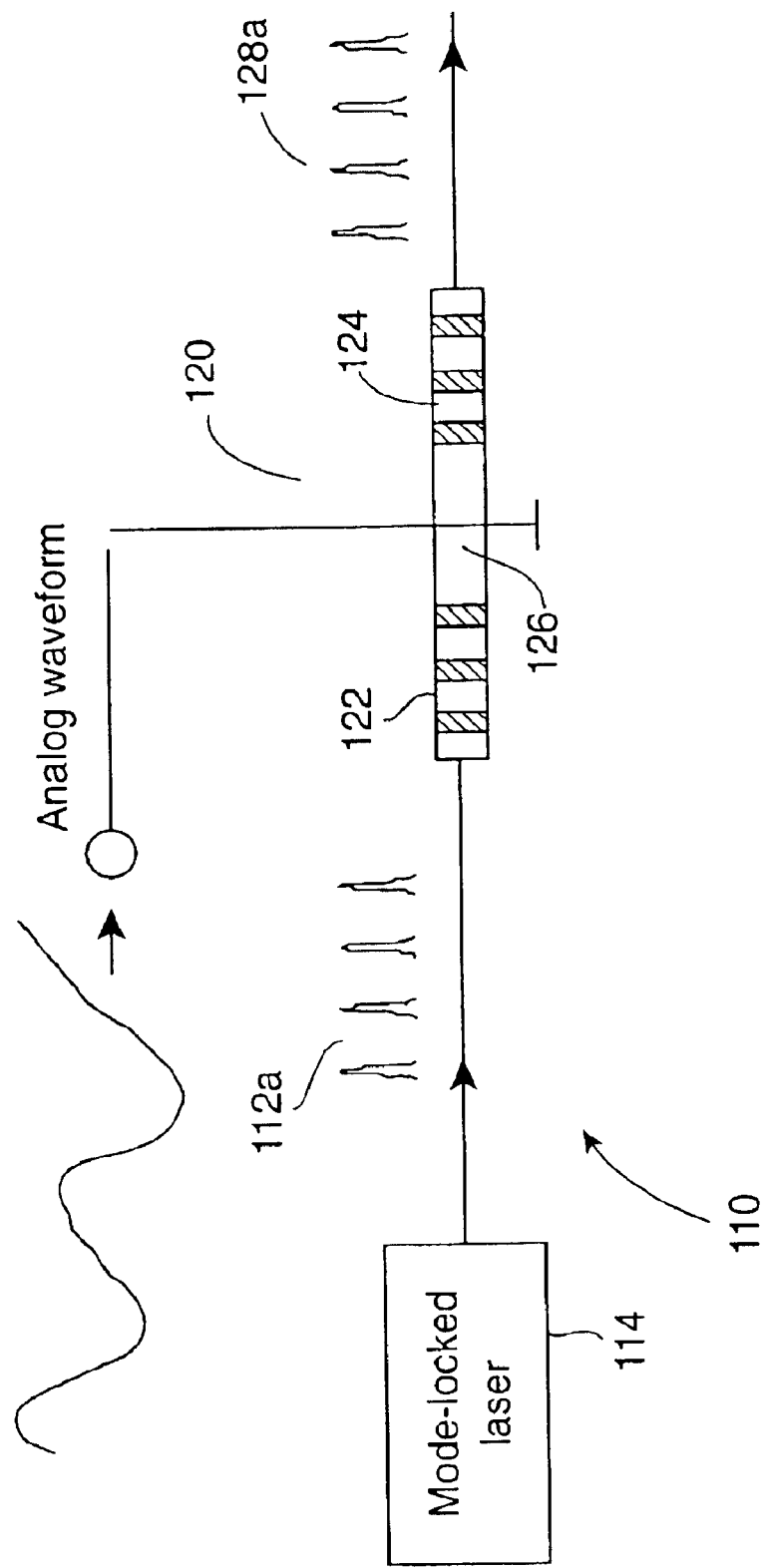
FIG. 7 shows in schematic form an alternative embodiment of a pulsed frequency modulator in accordance with the present invention.

Referring to FIG. 7, there is shown in schematic form an alternative embodiment of a pulsed frequency modulator in accordance with the present invention. The pulsed frequency modulation shown in FIG. 7 would be similar in operation to that depicted in FIG. 1, with the exception that the pulse train 112a from mode-locked laser 114 would have a pulse duration shorter than 1 ps. As such, the short duration pulses have a broad spectrum and, therefore, a length of fibre for self-phase modulation to broaden the pulse spectrum is not needed. The desired optical frequency slice is selected from SPM-broadened pulses by tunable Fabry-Perot filter 120 comprised of two DBR structures 122, 124 separated by electro-refractive (ER) section 126 supplied with electrodes. As with the embodiment depicted in FIG. 1, the filter is tuned by applying transverse electric field to the ER section to correspond to the applied analog waveform. A resultant filtered pulse train 128a is thereby provided.

What is claimed is:

1. A method of pulsed frequency modulation transmission for analog optical communication, comprising the steps of:
generating a train of broad spectrum optical pulses; and
selecting a desired optical frequency slice from the train of broad spectrum optical pulses by a tunable Fabry-Perot filter, the tunable Fabry-Perot filter having a pair of Distributed Bragg Reflectors separated by an electro-refractive section having tuning electrodes for applying transverse electric fields to the electro-refractive section corresponding to an analog waveform being applied to the tuning electrodes, to provide a pulse-frequency modulated train of optical pulses.

2. The method of pulsed frequency modulation transmission for analog optical communication of claim 1 wherein the step of generating a train of broad spectrum optical pulses includes the step of broadening spectrum of the optical pulses in a train of optical pulses by self-phase modulation to provide the train of broad spectrum optical pulses.

3. The method of pulsed frequency modulation transmission for analog optical communication of claim 1 wherein the step of generating a train of broad spectrum optical pulses includes the step of providing an optical pulse having a optical pulse duration shorter than 1 ps.

4. The method of pulsed frequency modulation transmission for analog optical communication of claim 1, further comprising the step of recovering the analog waveform from the pulse-frequency modulated train of optical pulses by:
splitting the pulse-frequency modulated train of optical pulses into a first optical beam and a second optical beam;
providing a first photodetector, the first photodetector providing a first current responsive to the first optical beam input thereon, the first photodetector having a first photodetector spectral response and being biased such that the first current is in a first direction;

providing a second photodetector, the second photodetector providing a second current responsive to the second optical beam input thereon, the second photodetector having a second photodetector spectral response and being biased such that the second current is in the first direction;

coupling an input of a transimpedance amplifier to an output of the first photodetector and to an input of the second photodetector to provide an output of the transimpedance amplifier proportional to the difference between the first current and the second current; and providing a first optical filter to receive the first optical beam prior to incidence upon the first photodetector and a second optical filter to receive the second optical beam prior to incidence upon the second photodetector, wherein the first photodetector spectral response and the second photodetector spectral response are each broader than respective passbands of the first optical filter and the second optical filter to provide photocurrent vs. optical frequency characteristics determined by the respective first optical filter and the second optical filter.

5. The method of pulsed frequency modulation transmission for analog optical communication of claim 4, wherein the step of splitting includes the step of amplifying and limiting the pulse-frequency modulated train of optical pulses prior to splitting.

6. The method of pulsed frequency modulation transmission for analog optical communication of claim 1, wherein the electro-refractive section is a Franz-Keldysh semiconductor waveguide.

7. A pulsed frequency modulation transmission system for analog optical communication, comprising:

a generator for generating a first train of optical pulses;

a self-phase modulator coupled to the generator for broadening spectrum of the optical pulses in the first train of optical pulses to provide a second train of spectrum broadened optical pulses; and a tunable Fabry-Perot filter coupled to the self-phase modulator for selecting a desired optical frequency slice from the second train of spectrum broadened optical pulses by, the tunable Fabry-Perot filter having a pair of Distributed Bragg Reflectors separated by an electro-refractive section having tuning electrodes for applying transverse electric fields to the electro-refractive section corresponding to an analog waveform being applied to the tuning electrodes, to provide a pulse-frequency modulated train of optical pulses.

8. The pulsed frequency modulation transmission system for analog optical communication of claim 7, further comprising a converter for converting a pulse-frequency modulated train of optical pulses into an electrical signal that is proportional to instantaneous frequency deviations of the pulse-frequency modulated train of optical pulses, comprising:

an optical splitter for splitting the pulse-frequency modulated train of optical pulses into a first optical beam and a second optical beam;

a first photodetector providing a first current responsive to the first optical beam input thereon from the optical splitter, the first photodetector having a first spectral response and being biased such that the first current is in a first direction;

a second photodetector, the second photodetector providing a second current responsive to the second optical beam input thereon from the optical splitter, the second photodetector having a second spectral response and being biased such that the second current is in the first direction;

a transimpedance amplifier having an input and an output, the input being coupled to an output of the first photodetector and to an input of the second photodetector to provide at the output of the transimpedance amplifier a current proportional to the difference between the first current and the second current; and a first optical filter located to receive the first optical beam prior to incidence upon the first photodetector and a second optical filter located to receive the second optical beam prior to incidence upon the second photodetector, wherein the first photodetector spectral response and the second photodetector spectral response are each broader than respective passbands of the first optical filter and the second optical filter to provide photocurrent vs. optical frequency characteristics determined by the respective first optical filter and the second optical filter.

9. The pulsed frequency modulation transmission system for analog optical communication of claim 8, further comprising an optical amplifier and a limiter serially coupled to the input of the optical splitter.

10. The pulsed frequency modulation transmission system for analog optical communication of claim 7, wherein the electro-refractive section is a Franz-Keldysh semiconductor waveguide.

11. A pulsed frequency modulation transmission system for analog optical communication, comprising:

a generator of optical pulses having a pulse duration of shorter than 1 ps to provide a train of broad spectrum optical pulses; and a tunable Fabry-Perot filter coupled to the coupled to the generator for selecting a desired optical frequency slice from the train of broad spectrum optical pulses, the tunable Fabry-Perot filter having a pair of Distributed Bragg Reflectors separated by an electro-refractive section having tuning electrodes for applying transverse electric fields to the electro-refractive section corresponding to an analog waveform being applied to the tuning electrodes, to provide a pulse-frequency modulated train of optical pulses.

12. The pulsed frequency modulation transmission system for analog optical communication of claim 11, further comprising a converter for converting a pulse-frequency modulated train of optical pulses into an electrical signal that is proportional to instantaneous frequency deviations of the pulse-frequency modulated train of optical pulses, comprising:

an optical splitter for splitting the pulse-frequency modulated train of optical pulses into a first optical beam and a second optical beam;

a first photodetector providing a first current responsive to the first optical beam input thereon from the optical splitter, the first photodetector having a first spectral response and being biased such that the first current is in a first direction;

a second photodetector, the second photodetector providing a second current responsive to the second optical beam input thereon from the optical splitter, the second photodetector having a second spectral response and being biased such that the second current is in the first direction;

a transimpedance amplifier having an input and an output, the input being coupled to an output of the first photodetector and to an input of the second photodetector to provide at the output of the transimpedance amplifier a current proportional to the difference between the first current and the second current; and a first optical filter located to receive the first optical beam prior to incidence upon the first photodetector and a second optical filter located to receive the second optical beam prior to incidence upon the second photodetector, wherein the first photodetector spectral response and the second photodetector spectral response are each broader than respective passbands of the first optical filter and the second optical filter to provide photocurrent vs. optical frequency characteristics determined by the respective first optical filter and the second optical filter.

13. The pulsed frequency modulation transmission system for analog optical communication of claim 12, further comprising an optical amplifier and a limiter serially coupled to the input of the optical splitter.

14. The pulsed frequency modulation transmission system for analog optical communication of claim 11, wherein the electro-refractive section is a Franz-Keldysh semiconductor waveguide.

15. A method of optical frequency modulation for an analog electrical signal comprising the steps of:

generating a stream of broad spectrum optical pulses, each optical pulse in said stream of broad spectrum optical pulses having a broad frequency spectrum;

coupling said pulses into a tunable optical filter; and controlling said tunable optical filter with said analog electrical signal to pass a narrow frequency spectrum from said broad frequency spectrum of each optical pulse.

16. The method of claim 15 wherein said tunable optical filter comprises a Fabry-Perot filter having two distributed Bragg reflector sections.

17. The method of claim 15 wherein the step of generating a stream of optical pulses comprises the steps of:

generating a stream of equally spaced optical pulses with a mode-locked laser; and directing the stream of equally spaced optical pulses into an optical fiber having a small normal dispersion.

18. An optical modulator for frequency modulation of an analog electrical signal onto optical pulses comprising:

an optical pulse generator generating a stream of broad spectrum optical pulses, each optical pulse in said stream of optical pulses having a broad frequency spectrum; and a tunable narrowband optical filter coupled to said optical pulse generator, said tunable narrowband optical filter being controlled by said analog electrical signal.

19. The optical modulator of claim 18 wherein said tunable narrowband optical filter comprises a Fabry-Perot filter having two distributed Bragg reflector sections.

20. The optical modulator of claim 18 wherein the optical pulse generator comprises:

a mode-locked laser generating a stream of equally-spaced optical pulses; and a self-phase modulator coupled to the mode-locked laser, said self-phase modulator producing said stream of broad spectrum optical pulses.

* * * * *